Oct. 15, 1968  R. E. FRENKEL ET AL  3,405,678
COOKING UTENSIL WITH TEMPERATURE INDICATING MEANS
Filed Dec. 30, 1966  3 Sheets-Sheet 1

INVENTORS
HERBERT M. FRENKEL
RICHARD E. FRENKEL
BY

ATTORNEY

Oct. 15, 1968  R. E. FRENKEL ET AL  3,405,678
COOKING UTENSIL WITH TEMPERATURE INDICATING MEANS
Filed Dec. 30, 1966  3 Sheets-Sheet 2
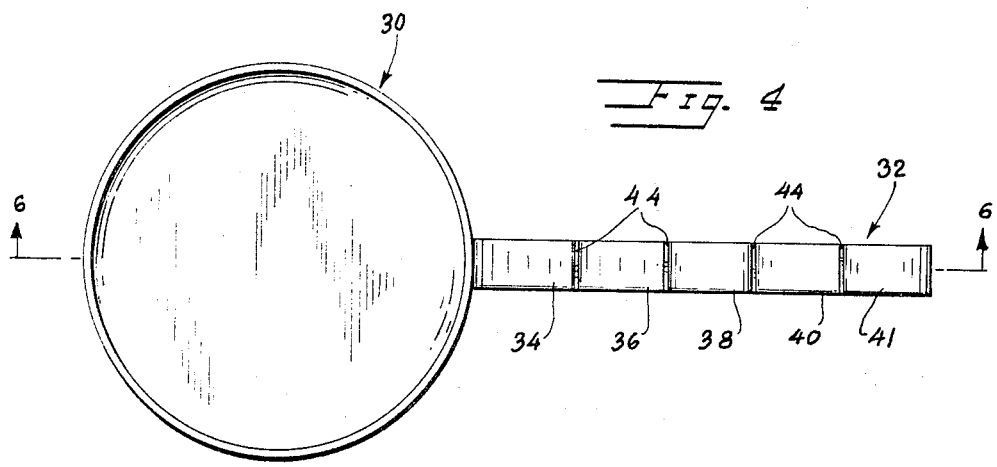
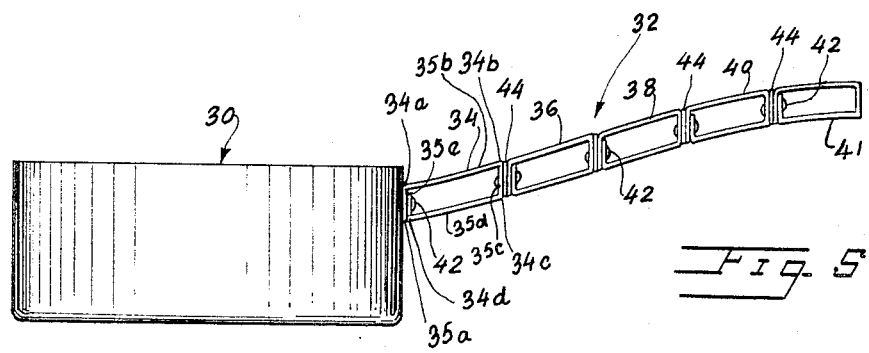
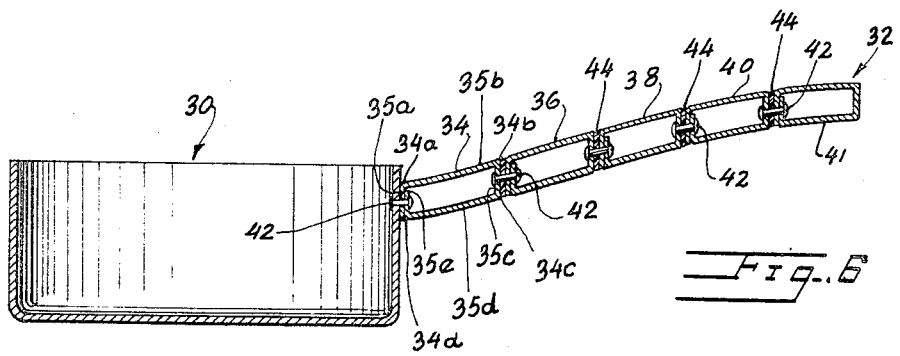
INVENTORS
HERBERT M. FRENKEL
RICHARD E. FRENKEL
BY
ATTORNEY

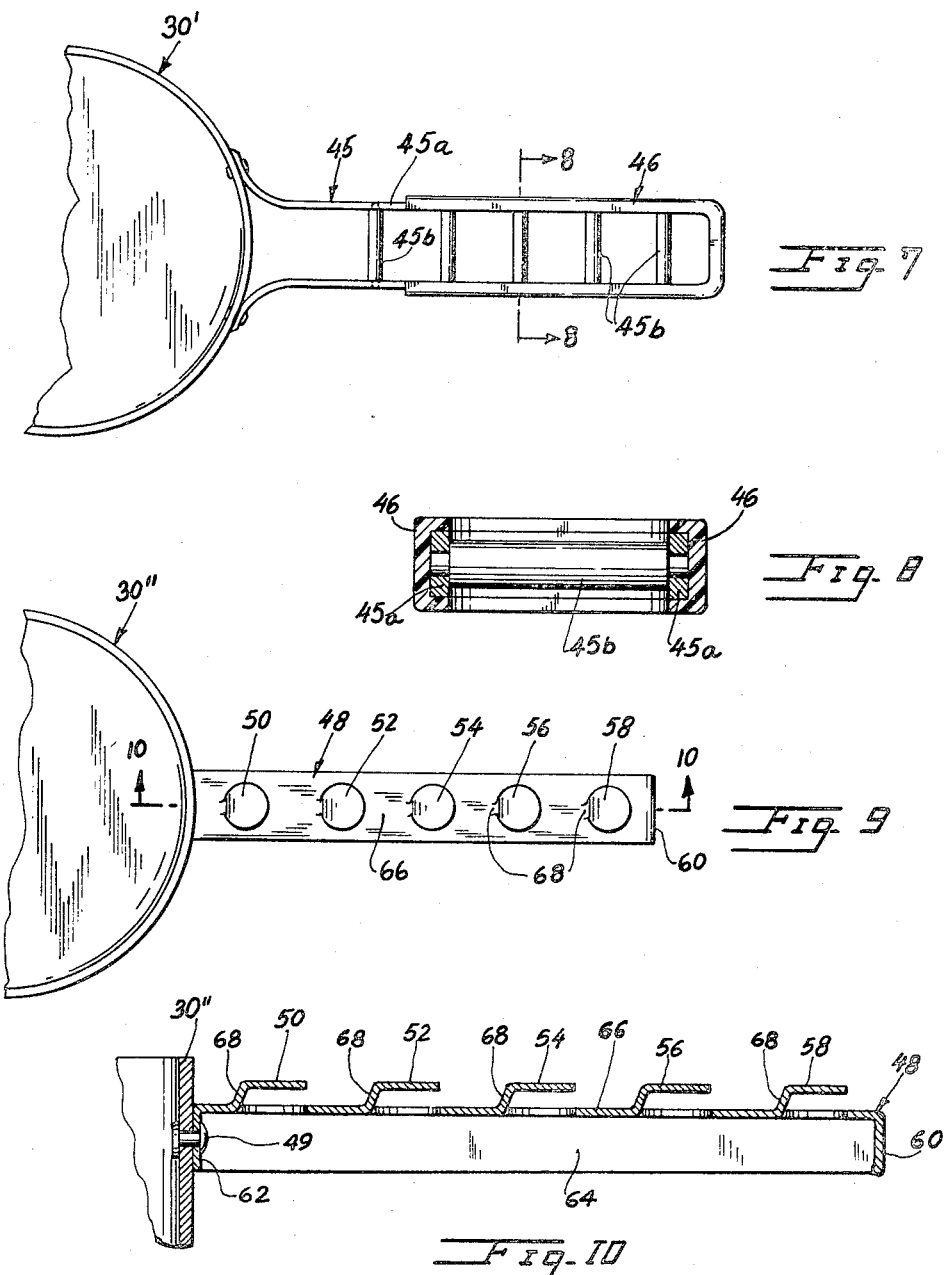

United States Patent Office 3,405,678
Patented Oct. 15, 1968

3,405,678
COOKING UTENSIL WITH TEMPERATURE
INDICATING MEANS
Richard E. Frenkel, 201 E. 77th St., and Herbert M. Frenkel, 205 E. 78th St., both of New York, N.Y. 10021
Filed Dec. 30, 1966, Ser. No. 606,253
8 Claims. (Cl. 116—114)

This invention relates to a cooking utensil which is provided with temperature indicating means.

The principal object of this invention is the provision of a cooking utensil having temperature indicating means which may be used by sightless persons. Cooking utensils with thermometers and other temperature indicating gauges are known to the art, but the use of such temperature indicating means is limited to those who are able to see and read.

The object of this invention is attained by providing temperature indicating means which may be sensed and interpreted by touch rather than sight. More specifically, a cooking utensil made in accordance with the present invention is provided with a temperature indicating handle having a plurality of temperature sensitive elements arranged sequentially with respect to the utensil proper. These heat sensitive elements utilize the principle of heat conductivity in order to measure temperature. The elements are heat conductive, and they are sequentially arranged such that the first is closest to the utensil and the last is farthest therefrom, so that heat will travel from the utensil to the heat sensitive elements in the order or sequence of their arrangement. Consequently, the first heat sensitive element will be the first to be exposed to the heat of the utensil, and the remaining heat sensitive elements will be sequentially exposed to the heat of the cooking utensil in direct relation to their location and distance therefrom. Distance, spacing, and insulation, among other factors, will result in heating the several heat sensitive elements to different temperatures in inverse relation to their respective distances from the heat source. In the use of this invention a sightless person would place a cooking utensil on a stove, and he would determine the temperature of its contents by feeling its handle, starting at its outermost end and then working his way toward the utensil. The outermost heat sensitive element would be relatively cool to the touch, and conversely the heat sensitive element which is closest to the utensil would be hottest to the touch. Through experience it is possible, by the use of this phased or sequential heat sensitive handle, for a sightless person to control the temperature of a cooking utensil and its contents.

Although this invention is intended mainly for the blind, it is clearly evident that it possesses great utility for those of normal sight. To a large extent it converts cooking by guess work to cooking at known and controlled temperatures.

The invention is illustrated in the accompanying drawing, in which:

FIGURE 4 is a plan view of a cooking utensil made in accordance with a second form of this invention, the handle being comprised of a plurality of heat sensitive elements joined seriatim.

FIGURE 5 is a side view thereof.

FIGURE 6 is a longitudinal section through the handle, showing the several heat sensitive elements and their insulating spacers which comprise it.

FIGURE 7 is a fragmentary plan view showing a handle of the general type illustrated in FIGURE 1, but secured to a different kind of cooking utensil and having an insulating element applied thereto.

FIGURE 8 is an enlarged sectional view on the line 8—8 of FIGURE 7.

FIGURE 9 is a fragmentary plan view of a cooking utensil of the type shown in FIGURE 7, but having a different type of handle secured thereto.

FIGURE 10 is an enlarged fragmentary section on the line 10—10 of FIGURE 9.

Figure 1:
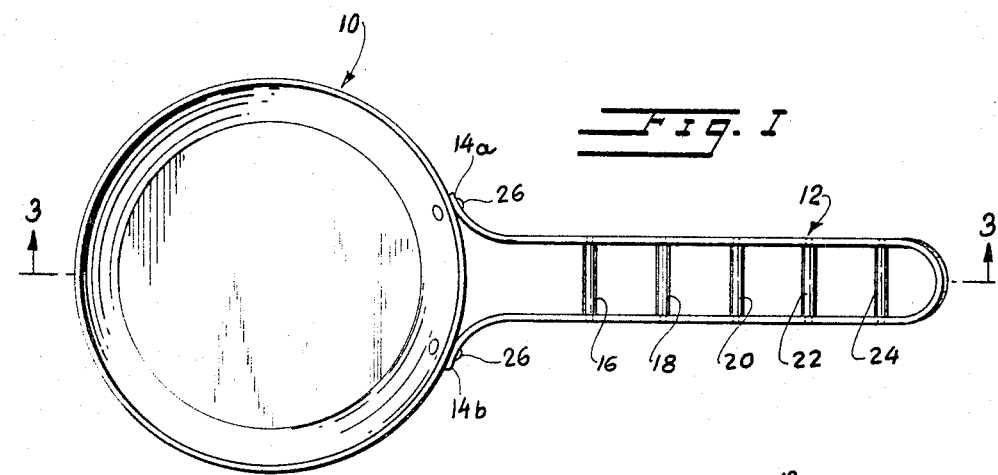
FIGURE 1 is a plan view of a cooking utensil made in accordance with one form of the invention, the handle comprising a unitary support and a plurality of heat sensitive elements secured thereto.
Figure 2:
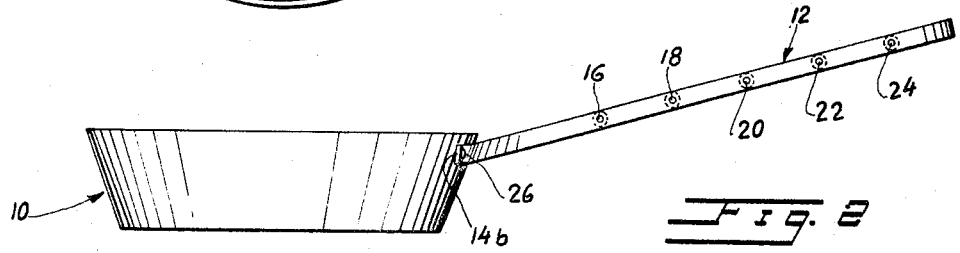
FIGURE 2 is a side view thereof.
Figure 3:
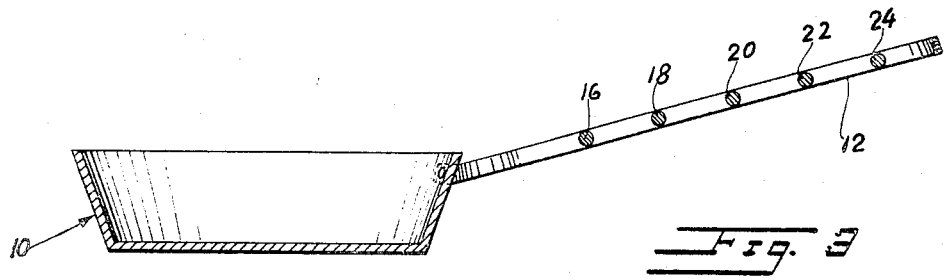
FIGURE 3 is a longitudinal section through the handle showing the individual heat sensitive elements secured thereto.

Referring now to the details of the first form of this invention as illustrated in FIGURES 1, 2 and 3 of the drawing, it will be seen that a conventional cooking utensil 10 is provided with a handle 12 consisting of a generally looped bar 14 and a plurality of heat sensitive elements 16, 18, 20, 22 and 24, respectively. The legs 14a and 14b of the looped bar 14 diverge and are bent into conformity with the contours of the cooking utensil, and more particularly its curved side wall. Rivets 26 or any other suitable fastening means may be used to secure the legs of the looped bar to the side of the cooking utensil. If desired, this may also be done by welding or any other conventional method.

Looped bar 14 is made of thermally conductive material, preferably the same metal of which the utensil proper is itself made. For example, an aluminum utensil would have an aluminum bar 14. Heat sensitive elements 16–24 would also be made of heat conductive material and similarly of the same metal of which the utensil and the looped bar are made. These heat sensitive elements may comprise a plurality of rods or bars which are secured to and are supported by the two sides of the looped bar 14. The elements may be secured to the bar by any conventional means.

In the use of this device the utensil and its contents are placed on a cooking fire, and the temperature of the utensil rises as it receives heat from the fire. Mainly by conductivity some of the heat will travel from the utensil to the looped bar 14. As each heat sensitive element 16–24 is reached, some of the heat is diverted into it, also mainly by conductivity. Element 16 will be the first to be heated, and then element 18 and then 20, 22, and finally 24. The temperature of element 16 will be the first to rise, and then that of element 18, 20, 22 and 24. The coolest of the elements will be 24 and the hottest 16, and the temperatures of the intermediate elements will differ in descending scale in the direction of the outermost element 24. By touching element 24, and then 22, and if necessary 20, etc., a person may determine the effective cooking temperature of the utensil and its contents.

Turning now to the second form of this invention, as illustrated in FIGURES 4, 5, and 6, it will be observed that a cooking utensil 30 made in accordance with this form of the invention is provided with a handle 32 which comprises a plurality of heat sensitive elements 34, 36, 38 and 40, respectively, joined seriatim to each other and to the cooking utensil proper. More particularly, each of these heat sensitive elements comprises a metal bar or strip which is bent at four spaced points to form a generally rectangular element. Taking heat sensitive element 34 as illustrative, the bar or strip of which it is made is bent at points 34a, 34b, 34c and 34d to form five integrally connected portions 35a, 35b, 35c, 35d and 35e. Portions 35a and 35e are disposed flat against each other, and a rivet 42 or similar fastening element secures them to the curved side wall of the cooking utensil. In a true rectangle, the four bends at points 34a, 34b, 34c and 34d would define right angles, but the shape and possible curvature of the handle requires that these angles deviate to the extent necessary to provide the configuration shown in the drawing. Thus the angles at points 34a and 34c are greater than 90 degrees, while those at points 34b and 34d are smaller than 90 degrees. Sides 35b and 35d may be flat, straight, parallel sides, or they may be curved to conform to the desired design and shape of the handle.

Heat sensitive elements 36, 38 and 40 are constructed in much the same manner as element 34 last above described. However, since they occupy and define different parts of the handle, they may assume slightly different shapes, so that the over-all configuration of all four interconnected heat sensitive elements corresponds to the design sought. Individual rivets 42 may link the several elements together to form an assembled whole.

In this form of the invention it is found desirable to provide wafer-shaped heat-insulating elements 44 between each pair of heat sensitive elements 34–40. The purpose of these insulating spacers is to reduce the heat flow from element to element, in order to achieve a perceptible heat gradient between successive heat sensitive elements.

Referring now to FIGURES 7 and 8, it will be noted that a heat sensitive handle 45 is secured to a cooking utensil 30' of any conventional type and configuration. Handle 45 is essentially of the same construction as handle 12 shown in FIGURES 1 to 3, inclusive, but it is provided with an insulating sleeve 46 to insulate the hand from the handle frame. This feature is intended to protect the hand from burns. However, it does not affect the thermal conductivity of the handle frame 45a, so that the heat sensitive elements 45b of the handle may be used in the manner above described for temperature detection purposes.

Referring now to FIGURES 9 and 10, which show still another form of this invention, it will be noted that, attached to cooking utensil 30'' is a handle 48. This handle is a simple stamping, which requires a single rivet 49 to secure it to the cooking utensil 30''. Essentially, handle 48 comprises a channel member having end walls 60 and 62, side walls 64, and a top wall 66. The handle is open at the bottom, although this is obviously not a requirement of the invention.

Punched out of the top wall 66 of the handle is a plurality of tabs 50, 52, 54, 56 and 58, respectively. These tabs remain attached to the top wall by means of narrow neck portions 68. It is through these narrow neck portions that heat is transmitted by conduction from the cooking utensil and through the handle proper, to the several tabs. These tabs are the heat sensitive elements which correspond to the several heat sensitive elements of the embodiments of this invention above described. The handle is used in the same manner as above described, and it will be understood that there is a heat gradient among the several tabs which will enable a sightless person to determine the approximate temperature of the cooking utensil and its contents by simply detecting the temperature differentials between tabs.

The forms of this invention which are hereinabove described are intended to illustrate and not to limit the scope of the invention. They are intended to disclose several of many possible forms of temperature sensitive handles capable of providing a sequential or phased series of heat measuring and indicating elements. Whether these individual elements are mounted on a separate handle, or whether they themselves comprise the handle, is immaterial, provided that they be mounted and arranged to receive different quantities of heat from the cooking utensil, resulting in perceptibly different temperatures ranging progressively and sequentially from a relatively high temperature adjacent the cooking utensil to a relatively low temperature at the outermost end of the handle.

Illustrative of the variations and modifications of which this invention is susceptible is the provision of a removable handle having all of the features of the invention above described but adapted for detachable mounting on various cooking utensils. We refer to conventional attaching means, such as hooking or clamping means, whereby a single handle may be applied to various utensils. The attaching means is conventional, but the handle is provided with the heat sensitive elements hereinabove described.

What is claimed is:
1. A cooking utensil with temperature indicating means, said temperature indicating means comprising a handle secured to said cooking utensil, a series of heat sensitive elements on said handle sequentially spaced with respect to said cooking utensil.

2. The combination of claim 1, wherein the handle comprises a generally looped frame whose legs are secured to the cooking utensil, the heat sensitive elements comprising a plurality of spaced parallel bars secured to the looped frame transversely thereof.

3. The combination of claim 2, wherein the looped frame and the transversely disposed bars are made of heat conductive material.

4. The combination of claim 1, wherein the handle comprises a plurality of said heat sensitive elements, said elements being interconnected to form a unitary handle structure, the first in said series of heat sensitive elements being secured to the cooking utensil, and the last in said series being remotest from said cooking utensil.

5. The combination of claim 4, wherein each heat sensitive element comprises a generally four-sided figure, being formed from a strip of heat conductive material bent in the same direction at four spaced points to define five sections, the two end sections being disposed in overlapping relationship.

6. The combination of claim 4, wherein heat insulating spacers are interposed between adjacent heat sensitive elements.

7. The combination of claim 1, wherein the heat sensitive elements are sequentially arranged with respect to each other and with respect to the cooking utensil, said heat sensitive elements being exposed by conduction to the heat of the cooking element, whereby their respective temperatures are caused to rise in phased sequence, the temperature of the heat sensitive element which is nearest the cooking utensil rising first and the temperature of the heat sensitive element which is remotest from the cooking utensil rising last, and the temperatures of the intermediate heat sensitive elements rising in progressive stages in the direction from said nearest to said remotest heat sensitive element.

8. The combination of claim 1, wherein the heat sensitive elements comprise a plurality of tabs which are partially struck out of the handle, said tabs remaining connected to the handle by means of narrow neck portions.

References Cited
UNITED STATES PATENTS

| 91,843 | 6/1869 | Hartshorn | 73—343 |
| 2,712,295 | 7/1955 | Haynes | 99—344 XR |
| 2,750,916 | 6/1956 | Hanington | 116—102 |

FOREIGN PATENTS

| 7,813 | of 1910 | England. |
| 883,051 | 7/1953 | Germany. |

LOUIS J. CAPOZI, *Primary Examiner.*